(12) United States Patent
Neumann

(10) Patent No.: US 8,810,650 B1
(45) Date of Patent: Aug. 19, 2014

(54) AGILE INTERROGATION HYPERSPECTRAL IMAGER AND METHOD OF USING SAME

(75) Inventor: Jonathan Neumann, Arlington, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1035 days.

(21) Appl. No.: 12/763,263

(22) Filed: Apr. 20, 2010

Related U.S. Application Data

(60) Provisional application No. 61/170,709, filed on Apr. 20, 2009.

(51) Int. Cl.
*H04N 7/18* (2006.01)
(52) U.S. Cl.
USPC .......................................................... 348/142
(58) Field of Classification Search
USPC .............................. 348/142; 356/330; 701/480
See application file for complete search history.

(56) References Cited

U.S. PATENT DOCUMENTS

| | | | |
|---|---|---|---|
| 5,379,065 A | 1/1995 | Cutts | |
| 6,008,492 A | 12/1999 | Slater | |
| 6,504,943 B1 | 1/2003 | Sweatt | |
| 6,813,018 B2 | 11/2004 | Richman | |
| 6,996,292 B1 | 2/2006 | Gentry | |
| 7,106,435 B2 | 9/2006 | Nelson | |
| 7,463,182 B1 * | 12/2008 | Morinaga et al. | 342/28 |
| 2005/0270528 A1 * | 12/2005 | Geshwind et al. | 356/330 |
| 2007/0080851 A1 * | 4/2007 | Shapira | 342/53 |

OTHER PUBLICATIONS

Reem Bassam SAFADI (An Adaptive Tracking Algorithm for Robotics and Computer vision applications, Dec. 1987).*
Neumann, Jonathan G, "DMD based hyperspectral augmentation for multi-object tracking systems".
Meyer, Reed D., Kearney, Kevin, J., Ninkov, Zoran, Cotton, Christopher T., Hammond, Peter and Statt, Bryan D., "RITMOS: a micromirror-based multi-object spectrometer", Proceedings of the SPIE 2004.
Blackman, Samuel S., "Multiple-Target Tracking with Radar Applications", Copyright 1986.

* cited by examiner

*Primary Examiner* — William C Vaughn, Jr.
*Assistant Examiner* — Naod Belai
(74) *Attorney, Agent, or Firm* — US Naval Research Laboratory; Suresh Koshy

(57) ABSTRACT

A scene is imaged onto a spatial light modulator. The scene is captured by collecting a pan-chromatic image using a pan-chromatic camera. An object in the scene is detected based on one of physical motion or hyperspectral detection. A spectral measurement of the scene is performed using a hyperspectral image spectrometer. A current position, a current positional velocity, and a current positional acceleration of the object is tracked. An estimated position, an estimated positional velocity, and an estimated positional acceleration of the object for a future time is estimated. A current spectrum, a current effective spectral velocity, and a current effective spectral acceleration of the object is tracked. An estimated spectrum, an estimated effective spectral velocity, and an estimated effective spectral acceleration of the object for a future time are estimated. An orientation of the spatial light modulator is controlled based on at least one of the estimated position, the estimated positional velocity, the estimated positional acceleration, the current spectrum, the current effective spectral velocity, and the current effective spectral acceleration of the object. Optionally, the spatial light modulator is a digital micromirror device.

10 Claims, 2 Drawing Sheets

AGILE INTERROGATION HYPERSPECTRAL IMAGER AND METHOD OF USING SAME

CROSS-REFERENCE TO RELATED APPLICATION

This application claims priority to U.S. Provisional Patent Application Ser. No. 61/170,709, entitled "AGILE INTERROGATION HYPERSPECTRAL IMAGER," to Neumann.

FIELD OF THE INVENTION

The present invention relates in general to a method and apparatus for imaging applications, and more particularly to a method and apparatus for imaging three dimensional hyperspectral data.

BACKGROUND OF THE INVENTION

Imaging applications must always address the problem that the world is multidimensional. But, most detectors (e.g., focal plane arrays) are essentially two dimensional recording devices. Capturing an image on a single frame requires the projection of the actual scene onto this detector, and the multidimensional information is inaccessible. However, by taking several projections in two dimensions, one can reconstruct some of the additional information.

This effect is particularly relevant to hyperspectral imaging, detection, and cueing. Hyperspectral data is typically described as a three dimensional data cube, with two spatial dimensions and one spectral dimension. When an imaging spectrometer samples an object, it records the unique spectrum at each sampled pixel location on the object. Since most focal plane arrays are two dimensional, this three dimensional data cube must be projected onto two dimensions, and reconstructed over several frames.

There are many ways to accomplish this projection, and each has advantages and disadvantages depending on the intended application. Traditional airborne or space based hyperspectral imagers typically use a narrow slit to admit only a line image to the spectrometer. A grating or prism then disperses this light in the direction perpendicular to the slit. In this way, the spectrum for each pixel in the line image is then recorded. The natural motion of the aircraft or spacecraft is then used to advance the spectrometer in space, and once this has occurred, a new image is recorded on the detector. The three dimensional image is then built up over time, line by line, as the platform moves across the scene. When collected in this way, the spectrum for each pixel in a line is recorded at the same time, and so it is easy to match a particular spectrum to a particular point in object space. However, the line image restriction requires scanning, and makes real-time processing based on two dimensional images that require multiple looks of the same scene (such as tracking applications) difficult. This type of system is generally referred to as a "pushbroom" type sensor, as the data is collected by scanning the slit over object space in the same way a broom pushed to clean a floor.

A different approach is to use a filter wheel or liquid crystal variable filter, and to take successive two dimensional images with different filters in place. In this approach, the hyperspectral data cube is also assembled over time. This type of system is useful for ground-based applications wherein the sensor is stationary; a moving platform will cause spectral mis-registration as the spectrum for each pixel is collected over time. Moving objects in the scene will cause mis-registration as well. This approach is useful for applications that require real-time processing based on multi-look two-dimensional images, but the mis-registration issues can sometimes lead to complicated correction efforts, especially for high speed platforms or fast moving objects. This type of system is generally referred to as a "staring" type sensor, as it can obtain a two dimensional image without scanning the scene.

Approaches also exist to capture the complete data cube on a single focal plane array. One example is a compressive imaging scheme that collects fewer data points than are contained in the entire cube (e.g., allowing the 3-D cube to be imaged on a 2-D focal plane array). But, the resultant output is an estimation of the true data cube based on a reconstruction algorithm. An alternative snapshot design, the Computed Tomography Imaging Spectrometer (CTIS), obtains the data cube by making many different projections over the entire array, resulting in a very low resolution data cube compared to the site of the focal plane array employed.

BRIEF SUMMARY OF THE INVENTION

Embodiments of the instant invention facilitate projection of a three dimensional hyperspectral data cube onto a standard focal plane array. For instance, an embodiment of the invention combines the advantages of the pushbroom and staring type sensors, in that the spectrum of any pixel in a two dimensional field can be interrogated just as in a staring system, but the spectrum for each pixel is also collected simultaneously, as in a pushbroom system. Additionally, the control system implemented with this device can adjust the configuration in to obtain the spectra of moving objects within the scene. An embodiment of the invention includes an apparatus comprising a digital micromirror device comprising a two dimensional array of individually addressable mirrors and a processor, wherein a target is imaged as a target image onto the digital micromirror device. The apparatus also includes a pan-chromatic camera, wherein the digital micromirror device directs at least a first portion of the target image to the pan-chromatic camera. The apparatus also includes a hyperspectral imaging spectrometer, wherein the digital micromirror device directs at least a second portion of the target image to the hyperspectral imaging spectrometer. The processor communicates with the pan-chromatic camera and the hyperspectral imaging spectrometer. The processor comprises a computer program product for implementing a method of controlling the digital micromirror device. The computer program product comprises computer readable media having stored thereon computer executable instructions that, when executed by the processor, cause the digital micromirror device to perform the following: track a current position, current positional velocity, and current positional acceleration of the target, estimate for a future time an estimated position, an estimated positional velocity, and an estimated positional acceleration of the target, and for controlling orientations of individually addressable mirrors of the plurality of individually addressable mirrors based on the estimated position, the estimated velocity, and the estimated acceleration of the target.

Optionally, the apparatus further comprises an optical element directing the target image onto the digital micromirror device. Optionally, the optical element comprises a system with optical power that forms the target image onto the digital micromirror device.

Optionally, the target image comprises a plurality of pixels, each pixel corresponding to two mirrors of the two dimensional array of individually addressable mirrors, a first mirror of the two mirrors of the two dimensional array of individually addressable mirrors imaging the pixel onto the pan-chromatic camera, a second mirror of the two mirrors of the two dimensional array of individually addressable mirrors imaging the pixel onto the hyperspectral imaging spectrometer.

Optionally, the target image comprises a plurality of pixels, each pixel corresponding to a respective mirror of the two dimensional array of individually addressable mirrors, the respective mirror switching orientation between the pan-chromatic camera and the hyperspectral imaging spectrometer.

Optionally, the target image comprises a first partial image comprising first partial image pixels and being imaged onto the pan-chromatic camera, the target image comprising a second partial image comprising second partial image pixels and being imaged onto the hyperspectral imaging spectrometer, the second partial image pixels being exclusive of the first partial image pixels.

Optionally, the computer executable instructions to track a current position, current velocity, and current acceleration of the target comprise computer executable instructions for implementing an $\alpha$-$\beta$-$\gamma$ filter and/or a Kalman filter. Optionally, the computer executable instructions also include instructions for object detection, and/or data/track association. See, e.g., methods of object detection, data association and track association described in S. S., Blackman, "Multiple-target Tracking with Radar Applications," Artech House, Inc., Dedham, Mass.: 1986.Blackman, 1986, incorporated herein by reference.

Another embodiment of the invention includes a method. A scene is imaged onto a spatial light modulator. The scene is captured by collecting a pan-chromatic image using a pan-chromatic camera. An object in the scene is detected based on one of physical motion and hyperspectral-based detection algorithms. A spectral measurement of the scene is performed using a hyperspectral image spectrometer. A current position, a current positional velocity, and a current positional acceleration of the object are tracked. An estimated position, an estimated positional velocity, and an estimated positional acceleration of the object for a future time are estimated. A current spectrum, a current effective spectral velocity, and a current effective spectral acceleration of the object are tracked. An estimated spectrum, an estimated effective spectral velocity, and an estimated effective spectral acceleration of the object for a future time are estimated. An orientation of the spatial light modulator is controlled based on at least one of the estimated position, the estimated positional velocity, the estimated positional acceleration, the current spectrum, the current spectral velocity, and the current spectral acceleration of the object.

Optionally, the spatial light modulator comprises a digital micromirror device. Optionally, the digital micromirror device comprises a processor, wherein the processor communicates with the pan-chromatic imaging spectrometer and the hyperspectral imaging spectrometer, the processor comprising a computer program product for implementing a method of controlling the digital micromirror device, the computer program product comprising computer readable media having stored thereon computer executable instructions that, when executed by the processor, cause the digital micromirror device to perform the following instructions: said tracking a current position, a current positional velocity, and a current positional acceleration of the object; said estimating an estimated position, an estimated positional velocity, and an estimated positional acceleration of the object for a future time; said tracking a current spectrum, a current effective spectral velocity, and a current effective spectral acceleration of the object; said estimating an estimated spectrum, an estimated effective spectral velocity, and an estimated effective spectral acceleration of the object for a future time; and said controlling an orientation of the spatial light modulator based on at least one of the estimated position, the estimated positional velocity, the estimated positional acceleration, the current spectrum, the current effective spectral velocity, and the current effective spectral acceleration of the object.

DETAILED DESCRIPTION OF THE INVENTION

Figure 1:
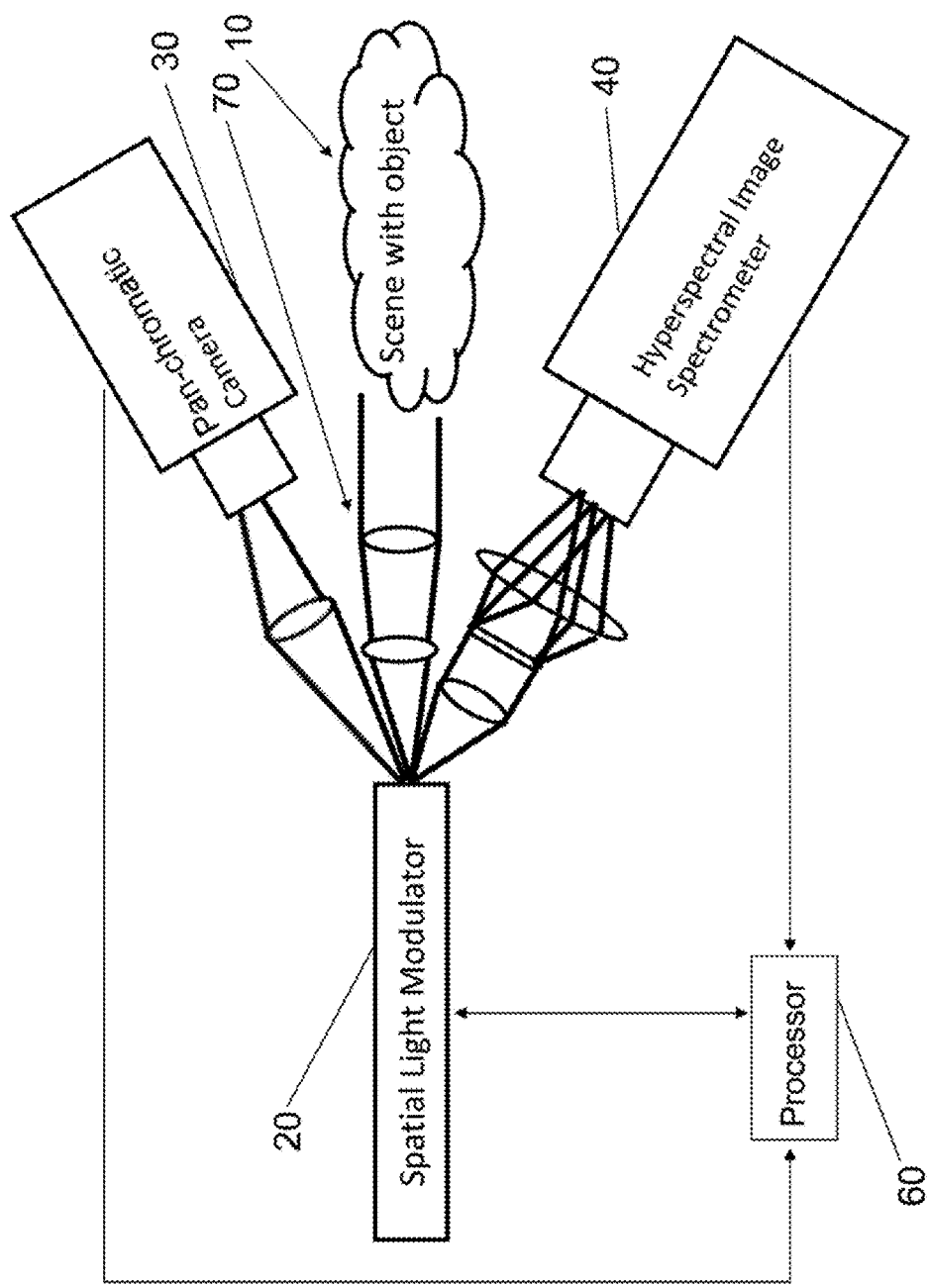
FIG. 1 is a schematic illustration of the instant invention.

Embodiments of the invention include a method and apparatus, for example, as shown by way of example in FIG. 1. A scene 10 is imaged onto a spatial light modulator 20. The scene is captured by collecting a pan-chromatic image using a pan-chromatic camera 30. An object in the scene 10 is detected based on one of physical motion or hyperspectral detection algorithms. A spectral measurement of the scene 10 is performed using a hyperspectral image spectrometer 40. A current position, a current positional velocity, and a current positional acceleration of the object are tracked. An estimated position, an estimated positional velocity, and an estimated positional acceleration of the object for a future time are estimated. A current effective spectrum, a current effective spectral velocity, and a current effective spectral acceleration of the object are tracked. An estimated spectrum, an estimated effective spectral velocity, and an estimated effective spectral acceleration of the object for a future time are estimated. An orientation of the spatial light modulator 20 is controlled based on at least one of the estimated position, the estimated positional velocity, the estimated positional acceleration, the current spectrum, the current effective spectral velocity, and the current effective spectral acceleration of the object.

Figure 2:
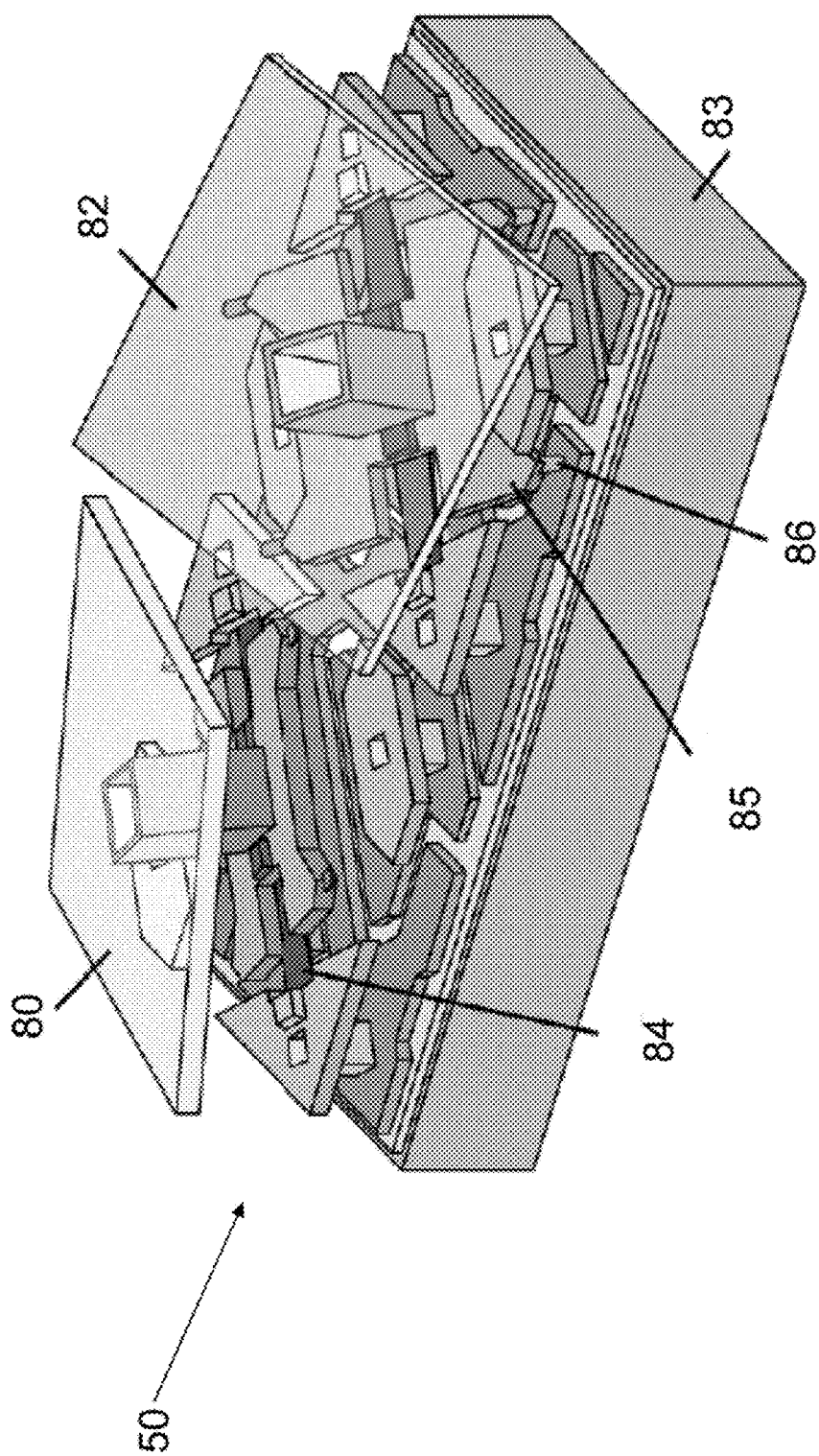
FIG. 2 is a perspective view of an illustrative digital micromirror device according to an embodiment of the instant invention.

Optionally, the spatial light modulator 20 comprises a digital micromirror device 50, as shown by way of example in FIG. 2. An illustrative digital micromirror device 50 includes a substrate, such as a CMOS substrate, and includes rotatable mirrors 80, 82 connected to the substrate 83, for example, by way of hinges 84, yokes 85, and spring tips 86. Optionally, the digital micromirror device 50 communicates with or has integrated therewith a processor 60, wherein the processor 60 communicates with the pan-chromatic camera 30 and the hyperspectral imaging spectrometer 40. The processor 60 comprises a computer program product for implementing a method of controlling the digital micromirror device 50. The computer program product comprises computer readable media having stored thereon computer executable instructions that, when executed by the processor 60, cause the digital micromirror device 50 to perform the following instructions: the tracking a current position, a current positional velocity, and a current positional acceleration of the object; the estimating an estimated position, an estimated positional velocity, and an estimated positional acceleration of the object for a future time; the tracking a current spectrum, a current effective spectral velocity, and a current effective spectral acceleration of the object; the estimating an estimated spectrum, an estimated effective spectral velocity, and an estimated effective spectral acceleration of the object for a future time; and the controlling an orientation of the spatial light modulator based on at least one of the estimated position, the estimated positional velocity, the estimated positional acceleration, the current spectrum, the current effective spectral velocity, and the current effective spectral acceleration of the object.

The digital micromirror device 50 comprising a two dimensional array of individually addressable mirrors. The digital micromirror device 50 shown in FIG. 2 shows a 1×2 array for illustration purposes only. A practical digital mirror device according to the instant invention is optionally larger depending on its application.

Optionally, the apparatus further comprises an optical element 70 directing the target image onto the digital micromirror device 50. Optionally, the optical element 70 comprises a system with optical power that forms the target image onto the digital micromirror device. Examples of the optical element include a Cassegrain telescope., a telecentric lens, a non-telecentric lens, and a microscope lens.

Once a particular object is detected, and requires a spectral measurement, there are many ways the digital micromirror device can be employed to collect both spectral data and additional pan-chromatic imagery. For instance, three examples of collecting spectral and pan-chromatic image data are described as follows.

In a first example, the target image comprises a plurality of pixels, each pixel corresponding to two mirrors 80, 82 of the two dimensional array of individually addressable mirrors, a first mirror of the two mirrors of the two dimensional array of individually addressable mirrors imaging the pixel onto the pan-chromatic camera 30, a second mirror of the two mirrors of the two dimensional array of individually addressable mirrors imaging the pixel onto the hyperspectral imaging spectrometer 40. This implementation has limited sensor resolution as compared to the following two examples because of the larger effective pixel size of the digital mirror device 50.

In a second example, the target image comprises a plurality of pixels, each pixel corresponding to a respective mirror 80 of the two dimensional array of individually addressable mirrors, the respective mirror switching orientation between the pan-chromatic camera 30 and the hyperspectral imaging spectrometer 40. That is, the pixel chosen for spectral measurement could alternate between the hyperspectral and pan-chromatic imager within a specified integration time. The advantage of this implementation is that no additional processing is required to collect all of the data necessary for both the pan-chromatic camera 30 and the hyperspectral image spectrometer 40. However, given a fixed integration time, the signal level will be adjusted according to the duty factor of the mirror switching. Additionally, switching mirror positions while integrating may cause stray light problems. Accordingly, frames are optionally interlaced, wherein in a first frame period the pan-chromatic image spectrometer 30 images the full object, and in the next frame period, the hyperspectral image spectrometer 40 takes spectral data with the understanding that the time resolution of the system is diminished.

In a third example, the target image comprises a first partial image comprising first partial image pixels and being imaged onto the pan-chromatic imaging spectrometer 30, the target image comprising a second partial image comprising second partial image pixels and being imaged onto the hyperspectral imaging spectrometer 40, the second partial image pixels being exclusive of the first partial image pixels. In this third and perhaps simplest example, the centroid of the object can be determined, and a single mirror can redirect light to the hyperspectral spectrometer 40. The advantage of this implementation is that, given a fixed integration time to simultaneously meet signal to noise and frame rate requirements, one can measure the spectrum of an object and see it in the pan-chromatic image simultaneously. However, the pan-chromatic image will have a small hole created by the mirror pointing towards the hyperspectral image spectrometer 40, for example, in which case the missing pan-chromatic intensity data would need to be estimated by summing the spectral signal measured at the hyperspectral image spectrometer, assuming a careful calibration.

Optionally, the computer executable instructions to track a current position, current velocity, and current acceleration of the target comprise computer executable instructions for implementing one of an $\alpha$-$\beta$-$\gamma$ filter and optionally a Kalman filter. Optionally, the computer executable instructions also include instructions for object detection, and/or data/track association, such as described in S. S., Blackman, "Multiple-target Tracking with Radar Applications," Artech House, Inc., Dedham, Mass.: 1986.Blackman. 1986.

The digital micromirror device ("DMD") 50 and operation thereof is described by way of non-limiting example as follows. The DMD 50, for example, includes a two dimensional array (e.g., 1024×768–total~786 k) of individually addressable mirrors. Each mirror can rotate about its diagonal axis in a bistable manner. For example, the mirrors can rotate +/−12 degrees about this diagonal axis. Each mirror is individually addressable, and with the proper electronics setup, the state of every mirror on the array can be updated at rates, for example, up to 13 kHz.

If an optical element 70 is used, to image light onto the DMD 50, then the DMD acts as a switch yard, directing the light incident on any particular pixel into one of two paths. In this case, one path leads to a standard pan-chromatic camera 30, while the other path leads to a hyperspectral imaging spectrometer 40 (e.g., a grating type hyperspectral image spectrometer).

The image of a scene is then projected onto the DMD 50. The micromirrors of the DMD then direct the light to either the pan-chromatic camera 30, or the hyperspectral image spectrometer 40, which optionally includes a plane-ruled transmission type diffraction grating. The DMD essentially forms the object of an image relay to the pan-chromatic channel. The light that is imaged on the DMD and directed to the pan-chromatic camera is simply imaged again at the detector. For the hyperspectral channel, however, the DMD serves as a real-time configurable "slit" that limits the spatial extent of the light incident to the spectrometer.

A description of certain components of the embodiments of the invention are described by way of non-limiting example as follows.

The hyperspectral image spectrometer 40 contains a focal plane array with camera electronics, for example a Prosilica EC 1280 camera, which has 1280×1024 pixels, with a 6.6 micron pixel pitch. This detector is an inexpensive CMOS focal plane array. Typical hyperspectral image spectrometers employ 1:1 magnification, but given the large DMD pixel pitch (13.68 micron), some demagnification is optionally employed to fit as much of the DMD onto the detector as possible. The demagnification factor employed is for example −0.428 (wherein the image is inverted). An extra margin is optionally included in this factor in order to accommodate additional displacement from spectral dispersion.

The pan-chromatic camera 30 is, for example, chosen to avoid interferences with the rest of the system mechanically, while maintaining a-non-vignetted optical path. For example, the pan-chromatic camera 30 uses, a Prosilica EC 1280 camera, which has 1280×1024 detectors, with a 6.6 micron pitch. As with the other subsystems, the lenses for this imager are catalog optics and are available from the Melles Griot catalog. The pan-chromatic channel is designed as a 1:1 relay (no magnification).

A real-time control system or processor for reconfiguring the device based on actual in-scene conditions as they changed is described by way of non-limiting example as follows. For example, moving objects are detected by the pan-chromatic camera. For example, if an object of interest is a single fiber tip amid a dark background, the object is detected by locating a region of high intensity. The centroid of this object is determined and is used as the object's location at the time of the image capture.

Processor 60 for example uses a standard α-β-γ filter to assist with tracking. As the centroid of the object is recorded over time, the filter estimates the object's position, velocity and acceleration. At image k, the estimated position, velocity, and acceleration are given by S. S., Blackman, "Multiple-target Tracking with Radar Applications." Artech House, Inc., Dedham. Mass.: 1986.Blackman, 1986:

$$x_s(k) = x_p(k) + \alpha[x_o(k) - x_p(k)]$$

$$v_s(k) = v_s(k-1) + Ta_s(k-1) + \frac{\beta}{qT}[x_o(k) - x_p(k)]$$

$$a_s(k) = a_s(k-1) + \frac{\gamma}{(qT)^2}[x_o(k) - x_p(k)]$$

where $x_o$ is the object's measured location at image k, $x_p$ is the object's predicted position at image k, α, β, and γ are smoothing parameters. T is the amount of time that has passed since the last measurement, and $x_s$, $v_s$, and $a_s$ are the estimated position, velocity, and acceleration, respectively, at image k. q is a parameter that allows for missing observations and is equal to the number of scans since the last measurement was obtained; in this case, due to the high contrast between the object and the background, the object was always detected, and q was assumed to be 1.

With these estimations of position, velocity, and acceleration, the location of the object can be estimated when the $(k+1)^{th}$ image is taken. This estimation is given by:

$$x_p(k+1) = x_s(k) + Tv_s(k) + \frac{T^2}{2}a_s(k)$$

After making this estimation, a group of 20×20 mirrors centered at this estimated location were used to point light to the spectrometer in order to measure the spectrum of the moving object. This enabled the spectrum from an object moving throughout the field of regard of the pan-chromatic imager to be measured in real-time, with an effective coverage rate compatible with a panchromatic imager (that is, for an n×m panchromatic imager, this device can measure the spectrum of any object within the n×m field of view, with a limit on the total number of objects, n×m/number of bands).

Exemplary embodiments for implementing the real-time control system for controlling the digital micromirror device are described by way of non-limiting example as follows. Portions of the control system operate in a processor 60 integrated with the digital micromirror device 50 or in a computing operating environment operably connected to the digital micromirror device. The computer operating environment, for example, includes a desktop computer, a laptop computer, a mobile computer, a server computer, and the like, in which embodiments of the invention may be practiced. A brief, general description of a suitable computing environment in which embodiments of the invention may be implemented is described as follows. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available tangible physical media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, and magnetic disk storage or other magnetic storage devices.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer may also include an input/output controller for receiving and processing input from a number of other devices, including a keyboard, mouse, or other device. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Because numerous modifications and variations of the above-described invention will occur to those of ordinary skill in the art, it is not desired to limit the invention to the exact construction and operation illustrated and described. Accordingly, all suitable modifications and equivalents may be resorted to, falling within the scope of the invention.

What is claimed as new and desired to be protected by Letters Patent of the United States is:

1. An apparatus comprising:
    a spatial light modulator;
    a digital micromirror device comprising a two dimensional array of individually addressable mirrors and a processor, wherein a target is imaged as a target image onto the digital micromirror device;
    a pan-chromatic camera, wherein said digital micromirror device directs at least a first portion of the target image to said pan-chromatic imaging spectrometer; and
    a hyperspectral imaging spectrometer, wherein said digital micromirror device directs at least a second portion of the target image to said hyperspectral imaging spectrometer; wherein said processor communicates with said pan-chromatic camera and said hyperspectral imaging spectrometer, said processor comprising a computer program product for implementing a method of controlling the digital micromirror device, the computer program product comprising computer readable media having stored thereon computer executable instructions that, when executed by the processor, cause the digital micromirror device to perform the following: track a current position, current positional velocity, and current positional acceleration of the target, estimate for a future time an estimated position, an estimated positional velocity, and an estimated positional acceleration of the target, track a current spectrum, a current effective spectral velocity, and a current effective spectral acceleration of the object, estimate an estimated spectrum, an estimated effective spectral velocity, and an estimated effective spectral acceleration of the object for a future time, and control an orientation of the spatial light modulator based on at least one of the estimated position, the estimated positional velocity, the estimated positional acceleration, the current spectrum, the current effective spectral velocity, and the current effective spectral acceleration of the object.

2. The apparatus according to claim 1, further comprising an optical element directing the target image onto the digital micromirror device.

3. The apparatus according to claim 2, wherein said optical element comprises a system with optical power that forms the target image onto the digital micromirror device.

4. The apparatus according to claim 1, wherein the target image comprises a plurality of pixels, each pixel corresponding to two mirrors of the two dimensional array of individually addressable mirrors, a first mirror of said two mirrors of said two dimensional array of individually addressable mirrors imaging the pixel onto said pan-chromatic imaging spectrometer, a second mirror of said two mirrors of said two dimensional array of individually addressable mirrors imaging the pixel onto said hyperspectral imaging spectrometer.

5. The apparatus according to claim 1, wherein the target image comprises a plurality of pixels, each pixel corresponding to a respective mirror of said two dimensional array of individually addressable mirrors, said respective mirror switching orientation between said pan-chromatic imaging spectrometer and said hyperspectral imaging spectrometer.

6. The apparatus according to claim 1, wherein the target image comprises a first partial image comprising first partial image pixels and being imaged onto said pan-chromatic camera, the target image comprising a second partial image comprising second partial image pixels and being imaged onto said hyperspectral imaging spectrometer, the second partial image pixels being exclusive of the first partial image pixels.

7. The apparatus according to claim 1, wherein the computer executable instructions to track a current position, current velocity, and current acceleration of the target comprise computer executable instructions for implementing one of an $\alpha$-$\beta$-$\gamma$ filter and a Kalman filter, object detection, data association, and track association.

8. A method comprising:
    imaging a scene onto a spatial light modulator;
    capturing the scene by collecting a pan-chromatic image using a pan-chromatic camera;
    detecting an object in the scene based on one of physical motion and hyperspectral-based detection;
    performing a spectral measurement of the scene using a hyperspectral image spectrometer;
    tracking a current position, a current positional velocity, and a current positional acceleration of the object;
    estimating an estimated position, an estimated positional velocity, and an estimated positional acceleration of the object for a future time;
    tracking a current spectrum, a current effective spectral velocity, and a current effective spectral acceleration of the object;
    estimating an estimated spectrum, an estimated effective spectral velocity, and an estimated effective spectral acceleration of the object for a future time; and
    controlling an orientation of the spatial light modulator based on at least one of the estimated position, the estimated positional velocity, the estimated positional acceleration, the current spectrum, the current effective spectral velocity, the current effective spectral acceleration of the object, the estimated spectrum, the estimated effective spectral velocity, and the estimated effective spectral acceleration of the object for a future time.

9. The method according to claim 8, wherein the spatial light modulator comprises a digital micromirror device.

10. The method according to claim 9, wherein the digital micromirror device comprises a processor, wherein said processor communicates with said pan-chromatic imaging spectrometer and said hyperspectral imaging spectrometer, said processor comprising a computer program product for implementing a method of controlling the digital micromirror device.

* * * * *